US010607055B2

(12) United States Patent
Jonsson et al.

(10) Patent No.: US 10,607,055 B2
(45) Date of Patent: Mar. 31, 2020

(54) METHOD FOR AUTHENTICATING A FINGER OF A USER OF AN ELECTRONIC DEVICE

(71) Applicant: Fingerprint Cards AB, Göteborg (SE)

(72) Inventors: Kenneth Jonsson, Kungälv (SE); David Tingdahl, Mölndal (SE)

(73) Assignee: Fingerprint Cards AB, Göteborg (SE)

(*) Notice: Subject to any disclaimer, the term of this patent is extended or adjusted under 35 U.S.C. 154(b) by 172 days.

(21) Appl. No.: 15/842,164

(22) Filed: Dec. 14, 2017

(65) Prior Publication Data

US 2018/0225495 A1 Aug. 9, 2018

(30) Foreign Application Priority Data

Feb. 6, 2017 (SE) .................................... 17500992

(51) Int. Cl.
*G06K 9/00* (2006.01)

(52) U.S. Cl.
CPC ......... *G06K 9/0002* (2013.01); *G06K 9/0008* (2013.01); *G06K 9/00053* (2013.01); *G06K 9/00067* (2013.01); *G06K 9/00087* (2013.01)

(58) Field of Classification Search
CPC ............. G06K 9/0002; G06K 9/00087; G06K 9/00067; G06K 9/0008; G06K 9/00053
See application file for complete search history.

(56) References Cited

U.S. PATENT DOCUMENTS

| 6,330,345 B1* | 12/2001 | Russo | G06K 9/0002 348/218.1 |
|---|---|---|---|
| 2003/0068072 A1* | 4/2003 | Hamid | G06K 9/0002 382/124 |
| 2006/0147096 A1* | 7/2006 | Lee | G06K 9/00067 382/124 |
| 2008/0253625 A1* | 10/2008 | Schuckers | G06K 9/00114 382/125 |
| 2013/0279770 A1* | 10/2013 | Abe | G06K 9/00087 382/124 |
| 2016/0042219 A1 | 2/2016 | Bae et al. | |
| 2017/0344846 A1* | 11/2017 | Yoshida | A61B 5/117 |
| 2018/0353109 A1* | 12/2018 | Li | A61B 5/1172 |

FOREIGN PATENT DOCUMENTS

CN 106096353 A 11/2016

OTHER PUBLICATIONS

Swedish Search Report for Swedish Application No. 1750099-2 dated Oct. 5, 2017, 2 pages.

* cited by examiner

*Primary Examiner* — Utpal D Shah
(74) *Attorney, Agent, or Firm* — RMCK Law Group, PLC (57) ABSTRACT

The present invention generally relates to a method for authenticating a finger of a user of an electronic device comprising a fingerprint sensor for sensing a fingerprint pattern, the method comprising the steps of: acquiring a candidate fingerprint image; determining, based on the candidate fingerprint image, a humidity level indication indicative of the humidity level of the finger; performing an authentication pre-process based on the humidity level indication; performing a fingerprint authentication process based on the pre-process to authenticate the user.

22 Claims, 8 Drawing Sheets

METHOD FOR AUTHENTICATING A FINGER OF A USER OF AN ELECTRONIC DEVICE

CROSS REFERENCE TO RELATED APPLICATIONS

This application claims priority to Sweden Application No. 1750099-2, filed on Feb. 6, 2017, the disclosure of which is incorporated herein by reference in its entirety.

TECHNICAL FIELD

The present invention generally relates to a method for authenticating a finger of a user of an electronic device comprising a fingerprint sensor for sensing a fingerprint pattern. The invention further relates to an electronic device using the method.

BACKGROUND OF THE INVENTION

Various types of biometric systems are used more and more in order to provide an increased security for accessing an electronic device and at the same time keep the user convenience at an acceptable level. In particular fingerprint sensors have been successfully integrated in such devices, for example, thanks to their small form factor, high performance and user acceptance. Among the various available fingerprint sensing principles (such as capacitive, optical, thermal etc.), capacitive sensing is most commonly used, in particular in applications where size and power consumption are important.

All capacitive fingerprint sensors provide an indicative measure of the capacitance between several sensing elements and a finger placed on the surface of the fingerprint sensor. Acquisition of a fingerprint image is typically performed using a fingerprint sensor comprising a plurality of sensing elements arranged in a two-dimensional manner, and a block based technique may be applied to the fingerprint sensor for acquiring a fingerprint image, where the blocks of sensing elements are sampled sequentially.

One of the problems associated with fingerprint sensors concerns the humidity level of the finger which is a fundamental problem for capacitive fingerprint sensors. For example, an increase in the humidity level may saturate the fingerprint image which presents verification difficulty and sometimes even rendering verification impossible. On the other hand, also low humidity of the finger may sometimes cause problems for fingerprint imaging due to e.g. coupling issues of the finger to the fingerprint sensor.

Thus, there is a need for improvements with regards to fingerprint verification based on fingerprint images acquired from fingers with high or low humidity levels.

SUMMARY OF THE INVENTION

In view of above-mentioned and other drawbacks of the prior art, it is an object of the present invention to provide an improved method for fingerprint authentication. In particular the method provides an improved authentication process for a wide range of finger humidity, e.g. for high humidity and low humidity (e.g. dry) fingers.

According to an aspect of the present invention, it is therefore provided a method for authenticating a finger of a user of an electronic device comprising a fingerprint sensor for sensing a fingerprint pattern, the method comprising the steps of: acquiring a candidate fingerprint image; determining, based on the candidate fingerprint image, a humidity level indication indicative of the humidity level of the finger; performing an authentication pre-process based on the humidity level indication; performing a fingerprint authentication process based on the authentication pre-process to authenticate the user.

The present invention is based upon the realization that before performing a fingerprint authentication, an authentication pre-process may be performed based on a detected humidity level of the finger. It is realized that such a pre-process may provide a way to adapt the authentication process to the humidity level of the finger. Such adaption may for example include applying authentication models tailored for specific humidity levels of a finger.

In one possible embodiment, determining the humidity level indication may further be based on an imaging acquisition setting for the fingerprint sensor. Such an imaging acquisition setting may for example relate to a gain or a shift in an analogue to digital converter used for converting signals from the fingerprint sensor pixels to digital signals, or they may be settings used for controlling a pixel gain before the conversion. Generally, attempting to overcome the problem with different finger conditions may include using a gain control for adjusting the gain level of an amplifier, in conjunction with the fingerprint sensor, when capturing the fingerprint image. Typically, at least one of the average or a peak signal level of a captured fingerprint image are analyzed and used for adjusting the gain to a suitable level. Generally, a comparatively high amplification is desirable for dry fingers, an in comparison low amplification for wet fingers and an in comparison medium amplification is desirable for normal fingers. By tuning the amplification based on e.g. different finger conditions, it will be possible to keep a sufficient contrast between ridges and valleys of the fingerprint, thus allowing a good use of the sensors full dynamic range, enabling a high quality feature extraction (i.e. being a representation of the fingerprint). The gain setting may be pixel gain, e.g. the gain of the amplifier as described above, or a gain setting in the analogue to digital converter used to convert the analogue signals from the amplifier to digital signals for further processing. The pixel gain setting is generally used for amplifying small signals from the pixel e.g. due to reduced capacitive coupling between the finger and sensor, or to compensate for reduced signals for other reasons (e.g. increased coating thickness, etc.). The analogue to digital converter gain setting may generally be used for increasing the contrast between e.g. ridge and valley in the image. The shift setting may be an analogue to digital converter shift setting and may generally be used to reduce large signals, e.g. due to limited dynamic range of the ADC. A shift setting shifts the signal levels from the fingerprint sensor from a relatively high level to a relatively lower level, or from a relatively low level to a relatively higher level by shifting the signal levels as a group. The acquisition settings (gain and shift) may have about 2 to 50 different levels of settings. Accordingly, the humidity level indication may be determined based on a combination comprising the acquisition setting and the candidate fingerprint image.

According to one embodiment, there may be included the steps of: forming a verification representation based on the candidate fingerprint image; retrieving an enrollment representation formed from an enrolment fingerprint image; determining the humidity level indication based on a comparison between the enrollment representation and the verification representation. Accordingly, the humidity level is determined based on a comparison of the user's enrolment fingerprint representation with the verification representation of the candidate fingerprint image. By comparing the verification representation with the enrolment representation it is advantageously possible to determine a humidity level indication in the form of a relative humidity level. In other words, the determined relative humidity level provides an indication of the present humidity of the finger compared to the humidity of the finger when the enrolment image was acquired. For example, it may be determined whether a match between the candidate fingerprint and the enrolment fingerprint represents a comparison between fingers of similar or different humidity levels. Features in the incoming verification image is compared with features in the existing enrolment image (or representation) whereby variations in the features between the enrolment image and the verification image are indicative of a change in humidity, thereby providing a convenient way of determining the relative humidity level.

Determining a relative humidity level indication is advantageous for several reasons. One reason being that some measures (e.g. ridge width as explained below) of humidity of a finger are most reliably acquired from the same individual, and thus difficult to compare between individuals making a relative measurement more accurate than an absolute measurement. For example, the ridge width of a fingerprint as appeared in a fingerprint image is generally wider for a humid finger than for a dry finger. Thus, generally speaking, the width of a ridge in a fingerprint image may be used for estimating the humidity of the finger. However, some people have wider ridges than other; therefore the absolute width is not a reliable measure of the absolute humidity. Instead, by comparing a ridge width in a previously acquired enrolment image with a ridge width in a present fingerprint image from the same person, a relative humidity indication may be determined as a more reliable measure of humidity. Alternatively, a set of features (e.g. ridges or valley) in the previously acquired enrolment image is compared with a set of features in the present fingerprint image from the same person. The features will have changed in appearance (e.g. the apparent size of the ridges may have increased or decreased depending on the humidity) depending on the humidity change of the finger between the time instances the images are captured.

The fingerprint sensor may be implemented using any kind of current or future fingerprint sensing principle, including for example capacitive, optical, or thermal sensing technology. However, at present capacitive sensing is most preferred. Both one and two-dimensional sensors are possible and within the scope of the invention. Furthermore, the electronic device may advantageously be a mobile phone. However, other electronic devices are of course thinkable such as tablets, laptops desktop computers, etc. Such a capacitive fingerprint sensor may comprise a two-dimensional array of sensing elements configured to obtain a measure of the capacitive coupling between the finger and each sensing element.

In the context of the present application, the "enrolment representation" and/or the "verification representation" of a fingerprint image may be any information extracted from the fingerprint image, which is useful for assessing the similarity between fingerprint images acquired at different times. For instance, the enrolment/verification representation of the fingerprint image may comprise descriptions of fingerprint features (such as so-called minutiae) and information about the positional relationship between the fingerprint features. Alternatively, the representation of the fingerprint image may be the image itself, or a compressed version of the image. For example, the image may be binarized and/or skeletonized.

Various ways of extracting such verification representation or enrolment representation from a fingerprint image are well-known to a person of ordinary skill in the relevant art.

According to one embodiment, the humidity level indication may be determined based on a histogram based on the comparison between the enrollment representation and the verification representation.

The histogram may for example be a hamming distance histogram.

According to another embodiment of the invention, the authentication pre-process may comprise: selecting an authentication model among a plurality of authentication models based on the humidity level indication, whereby the fingerprint authentication process is performed using the selected authentication model. As mentioned above, the humidity level indication may be a relative humidity level or an absolute humidity level. Selecting the authentication model may be determined by a threshold humidity level for each of the models. For example, a first model may be selected for a humidity level higher than a first threshold, a second model may be selected for a humidity level higher than a second threshold, a third model may be selected for a humidity level higher than a third threshold, etc. The models may be applied in the liveness detection process and/or in the verification process of the fingerprint authentication. Each model is adapted for a respective humidity level. With a specific model for each humidity level the performance (e.g. robustness) of feature extraction and matching is advantageously improved. Thus, in contrast to attempting to use a single model for all cases of humidity, it is here provided to select the most appropriate model (for liveness and/or verification) depending on the humidity level of the finger.

According to another embodiment, there may be included the steps of: performing a first fingerprint authentication process based on the candidate fingerprint image and a first authentication model, when the fingerprint authentication process results in a decision that authentication is not granted, determine, based on the candidate fingerprint image, the humidity level indication indicative of the humidity level of the finger; selecting the authentication model based on the humidity level indication. In other words, authentication (i.e. fingerprint verification and liveness test) is first performed, if it fails, a humidity level indication of the finger is determined based on the first candidate image, whereby an authentication model is selected and a second authentication is performed, now based on the second model and the candidate fingerprint image.

According to an embodiment of the invention, the authentication pre-process may comprise: forming a normalized candidate fingerprint image from the candidate fingerprint image based on the humidity level indication, wherein the fingerprint authentication process is performed on the normalized candidate fingerprint image. Thus, an advantageous way is provided for recovering features in the candidate fingerprint image despite relatively high or relatively low humidity. Accordingly, normalization is an advantageous way of making further use of the humidity level indication. As an example, the normalization may be based on predetermined data (e.g. empirically determined) relating to how the appearance of fingerprint features in a fingerprint image changes depending on the humidity level. The ridge width may for example appear wider for a humid finger than for a dry finger and broken ridges are commonly present in images of dry fingers. Thus, the normalizing may be effective to e.g. normalize the ridge width and to link broken ridges. One type of normalization within the scope of the invention is to apply a Gabor filter to the pixel values of the fingerprint image.

According to one embodiment, the authentication pre-process may comprise providing instructions to the user based on the humidity level indication. Thus, if the verification fails, the user may be provided with instructions which increase the probability for successful subsequent verification. For example, in case the humidity level is relatively high, e.g. such that the candidate fingerprint image is of too poor quality for feature extraction, the user may be instructed to wipe his or her fingers to reduce the humidity level. Other types of instructions may be provided depending on the determined humidity level indication.

Subsequent to instructing the user and prior to performing a fingerprint authentication process it may advantageously be included to acquire a second candidate fingerprint image; determining, based on the second candidate fingerprint image, a second humidity level indication indicative of the humidity level of the finger; performing a second authentication pre-process based on the second humidity level indication, whereby, the fingerprint authentication process is performed based on the second authentication pre-process and the second candidate fingerprint image to authenticate the user. In other words, the authentication process starts over after the user received the instruction.

According to a second aspect of the present invention, there is provided a fingerprint sensing system comprising: a fingerprint sensor being configured to obtain a fingerprint image of at least a portion of a user's finger; and a control unit connected to the fingerprint sensor configured to: control the fingerprint sensor to acquire a candidate fingerprint image; determine, based on the candidate fingerprint image, a humidity level indication indicative of the humidity level of the finger; perform an authentication pre-process based on the humidity level indication; perform a fingerprint authentication process based on the authentication pre-process to authenticate the user.

The control unit may further be configured to perform the steps of the previously mentioned embodiments, or at least to control hardware/software based unit to perform the steps.

In addition, the control unit may be configured to operate a support vector machine for determining a humidity level indication. Alternatively or additionally, the control unit may be configured to operate a neural network for determining a humidity level indication.

Further embodiments of, and effects obtained through this second aspect of the present invention are largely analogous to those described above for the first aspect of the invention.

According to a third aspect of the invention, there is provided an electronic device, comprising: a fingerprint sensing system according to the second aspect, and a device controller for: providing an authentication request for the finger to the fingerprint sensing system; receiving the authentication signal from the fingerprint sensing system; and performing at least one action if the authentication signal indicates authentication success. In other words the fingerprint sensing system is preferably part of an electronic device. Furthermore, the mentioned "an action" may for example be unlocking a locked portable device, e.g. in case the portable device is a mobile phone. The at least one action may of course be any type of action suitably used when there is a need to authenticate a finger.

There is further provided a computer program product comprising a non-transitory computer readable medium having stored thereon computer program means for controlling an electronic device, the electronic device comprising a control unit, a fingerprint sensor, wherein the computer program product comprises: code for controlling the fingerprint sensor to acquire a candidate fingerprint image; code for determining, based on the candidate fingerprint image, a humidity level indication indicative of the humidity level of the finger; code for performing an authentication pre-process based on the humidity level indication; and code for performing a fingerprint authentication process based on the authentication pre-process to authenticate the user.

Within the context of the invention, the expression "fingerprint image" should be interpreted broadly and to include both a regular "visual image" of a fingerprint of a finger as well as a set of measurements relating to the finger when acquired using the fingerprint sensor. In addition, the expression "processing circuitry" should be understood to include any type of computing device, such as an ASIC, a microprocessor, etc. It should also be understood that the actual implementation of such a processing circuitry may be divided between a plurality of devices/circuits.

In summary, the present invention relates to a method for authenticating a finger of a user of an electronic device comprising a capacitive fingerprint sensor for sensing a fingerprint pattern, the method comprising the steps of: acquiring a candidate fingerprint image; determining, based on the candidate fingerprint image, a humidity level indication indicative of the humidity level of the finger; performing an authentication pre-process based on the humidity level indication; performing a fingerprint authentication process based on the pre-process to authenticate the user.

Further features of, and advantages with, the present invention will become apparent when studying the appended claims and the following description. The skilled addressee realize that different features of the present invention may be combined to create embodiments other than those described in the following, without departing from the scope of the present invention.

BRIEF DESCRIPTION OF THE DRAWINGS

The various aspects of the invention, including its particular features and advantages, will be readily understood from the following detailed description and the accompanying drawings, in which.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person. Like reference characters refer to like elements throughout.

Figure 1:
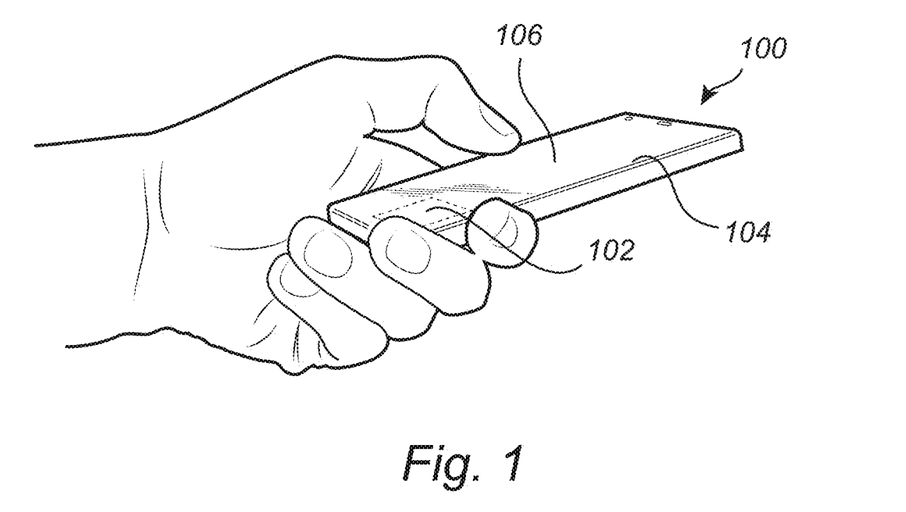
FIG. 1 schematically exemplify an electronic device according to the present invention, in the form of a mobile phone comprising an integrated fingerprint sensor.

Turning now to the drawings and to FIG. 1 in particular, there is schematically illustrated the electronic device according to the present invention, in the form of a mobile phone 100 with an integrated fingerprint sensor 102 and a display unit 104 with a touch screen interface 106. In this embodiment the fingerprint sensor 102 and the display unit 104 are together arranged at the front side of the mobile phone 100. The fingerprint sensor 102 may, for example, be used for unlocking the mobile phone 100 and/or for authorizing transactions carried out using the mobile phone 100, etc. The fingerprint sensor 102 may of course also be placed on the backside of the mobile phone 100.

Preferably and as is apparent for the skilled person, the mobile phone 100 shown in FIG. 1 further comprises a first antenna for WLAN/Wi-Fi communication, a second antenna for telecommunication communication, a microphone, a speaker, and a phone control unit. Further hardware elements are of course possibly comprised with the mobile phone. It should furthermore be noted that the invention may be applicable in relation to any other type of portable electronic device, such as a laptop, a remote control, a tablet computer, or any other type of present or future similarly configured device.

Figure 2:
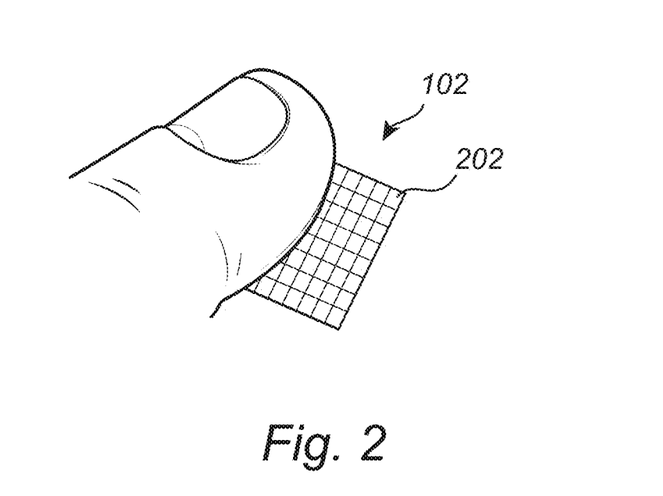
FIG. 2 schematically shows the fingerprint sensor array comprised in the electronic device in FIG. 1.

With reference to FIG. 2, there is conceptually illustrated a somewhat enlarged view of the fingerprint sensor 102. In the case of employing a capacitive sensing technology, the fingerprint sensor 102 is configured to comprise a large plurality of sensing elements, preferably arranged as a two-dimensional array. The two-dimensional array may have sizes depending on the planned implementation and in an embodiment 160×160 pixels are used. Other sizes and aspect ratios are of course possible and within the scope of the invention, including two-dimensional array with less pixels as compared to the above example. A single sensing element (also denoted as a pixel) is in FIG. 2 indicated by reference numeral 202.

Figure 3:
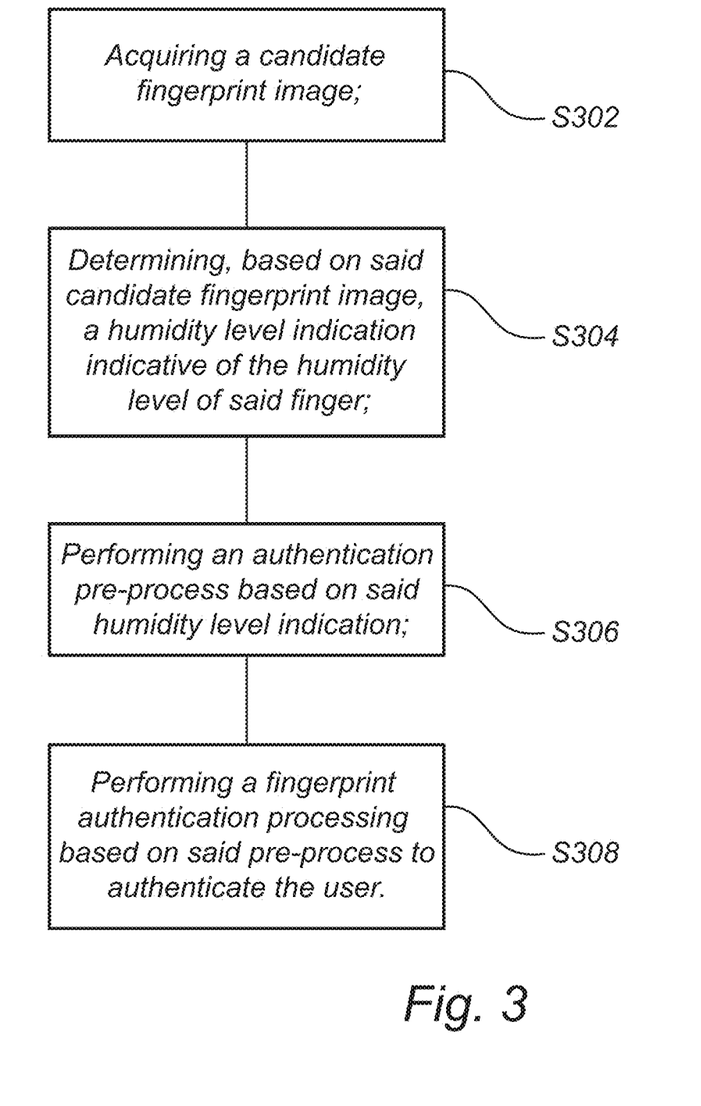
FIG. 3 is a flow-chart of method steps according to an embodiment of the invention.

FIG. 3 is a flow-chart of method steps for authenticating a finger of a user of an electronic device comprising a fingerprint sensor for sensing a fingerprint pattern. In a first step a candidate fingerprint finger is acquired S302. Thus, the fingerprint sensor is prompted by e.g. the presence of the user's finger to acquire a fingerprint image of the candidates fingerprint. Next, based on the candidate fingerprint image, a humidity level indication indicative of the humidity level of the finger is determined S304. Determining the humidity level may be performed in several ways, for example by comparing the candidates fingerprint image with enrollment templates for the user to thereby determine a relative humidity level, or by determining an absolute humidity level. The absolute humidity level may be determined by e.g. a machine learning network which has been trained on fingerprint images with known humidity levels determined by e.g. a skin moisture sensor. Based on the humidity level indication, an authentication pre-process is performed S306. Several options for the authentication pre-process exist and they each provide improved performance for authentication of humid fingers. The authentication pre-processes are outlined below. Subsequently S308, a fingerprint authentication process is performed based on the pre-process to authenticate the user.

As mentioned above, determining the humidity level may be performed by training a machine learning algorithm (in a machine learning network) on training data comprising fingerprint images annotated with known humidity levels. An absolute level of humidity may be determined by a machine learning algorithm having been trained on the training data by evaluating feature values (see below) from the acquired fingerprint image which may be recognized from the training data. Such a machine learning algorithm may thus be given image features with labels comprises e.g. a categorization of humidity (e.g. 3, 4, 5, 6, 7, or 8, etc., different categories). The machine learning network may comprise a support vector machine or a neural network which are known as such to the skilled person.

Another possible way of determining the humidity level indication is to instead detect a change in humidity, i.e. a relative humidity indication. The change in humidity may be determined relative a previous fingerprint image such as an enrolment image. In such case, features in the candidate fingerprint image are compared with features in an enrolment image. With this approach, the same representation of the fingerprint image used in liveness detection during the authentication may advantageously be used also for determining the humidity level indication. In other words, the verification representation of the fingerprint image used for liveness detection is recycled and entered also into a procedure for determining the humidity level detection.

For verification in an authentication process, a set of so called inliers are typically determined. Although the concept of an inlier is known as such in the art, it will be briefly described here. An inlier is a fingerprint feature pair, preferably a local feature pair, comprised of one feature in the verification image and one feature in the enrolment image which have been found to match. More precisely, an inlier is a match between a feature in the enrolment image and a corresponding feature in the verification image. The match is both with respect to appearance and geometry (i.e. it conforms the overall transformation obtained in the matching). Each feature pair is typically represented by a binary string and a location in the image. For a comparison between two features, the number of positions in the two binary strings that are different is counted. This number is referred to as the "Hamming distance", known as such in the art. For a feature pair to be labeled as an inlier, it is required that the hamming distance falls below a threshold value. In other words, for an inlier the hamming distance between the feature representation and its corresponding feature in the enrolment image is below a threshold value. For determining the humidity level indication, in this case in the form of a relative humidity, we may use the Hamming distance information as will now be conceptually explained and conceptually illustrated in FIG. 4.

Figure 4:
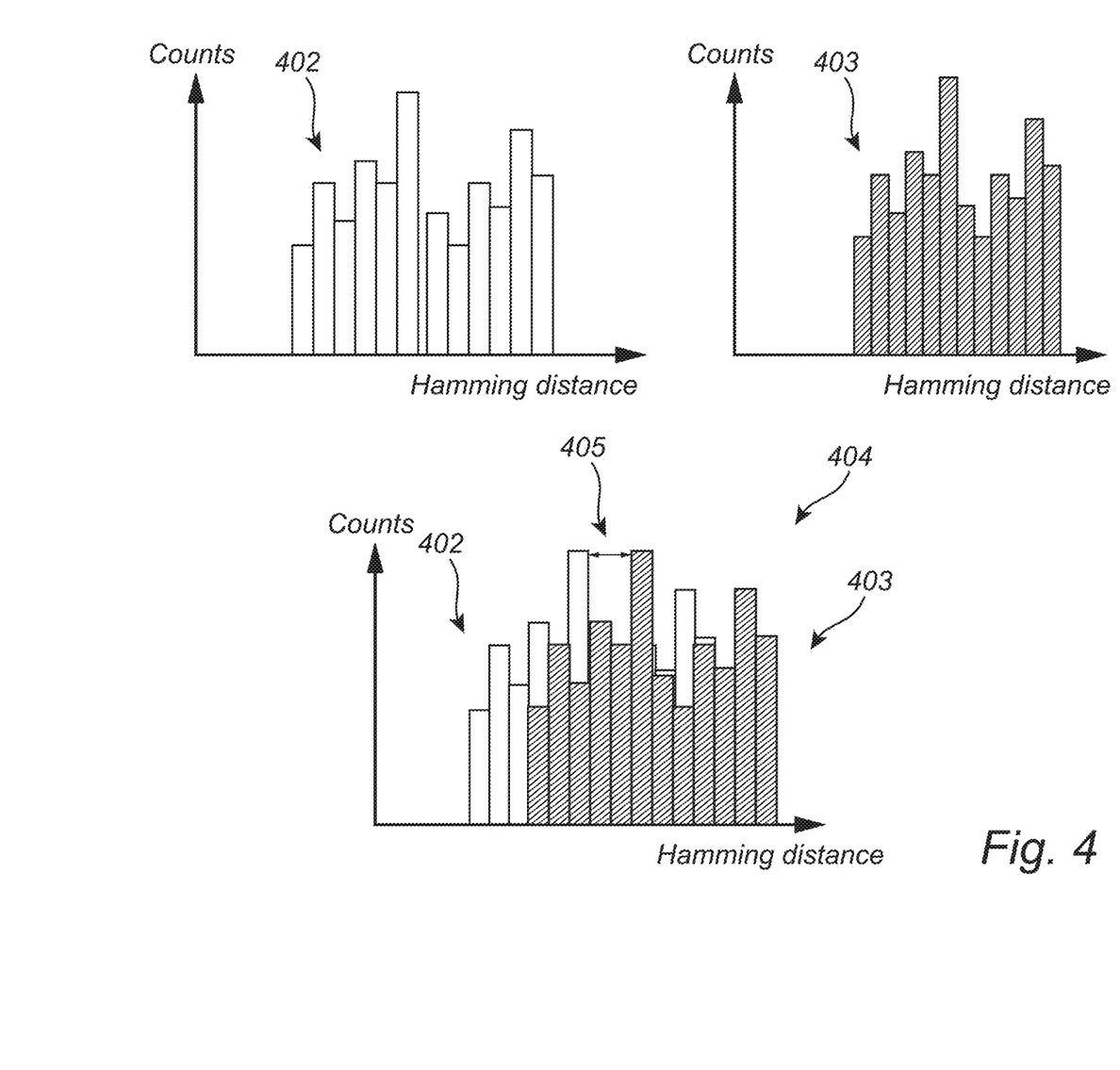
FIG. 4 illustrates a shift in hamming distance histograms.

As described above, each match between a candidate fingerprint image and an enrolment image results in a plurality of inliers which may be represented as a hamming distance histogram 402 as conceptually shown in FIG. 4. The histogram shows the number of counts at a specific hamming distance. Detecting a relative change in humidity is based at least partly on the observation that a distribution of hamming distances for a finger with relatively low humidity will be shifted with respect to a distribution of hamming distances for a finger with relatively high humidity. A histogram 403 of hamming distances for a finger with relatively low humidity is also conceptually shown in FIG. 4. In FIG. 4 there is further shown a conceptual combined histogram 404 where a shift 405 between the histograms 402 and 403 is indicated. Thus, in FIG. 4 it is conceptually illustrated that the hamming distance histogram 402 representing the differences between an enrolment image and a verification fingerprint image from a wet finger will be shifted with respect to the hamming distance histogram 403 representing the differences between the enrolment image and a verification fingerprint image from a dry finger. This knowledge may be used by a machine learning algorithm. In other words, the hamming distance histogram (such as for example histogram 402 or 403) is fed to the machine learning algorithm which classifies it as e.g. dry, normal, or wet in a relative manner. The machine learning algorithm has thus been taught on previous data (histograms) to recognize the relative humidity level of the finger in the present fingerprint image. The learning data may thus include the shift between histograms as described above. The training data may comprise hamming distance histograms (or other types of histograms) formed from enrolment-verification image pairs from dry (enrolment)-dry (verification), wet/humid (enrolment)-wet/humid (verification), dry (enrolment)-wet/humid (verification), and wet/humid (enrolment)-dry (verification) fingers, and in further various levels of dryness and humidity of the finger during enrolment and/or verification.

In addition to the above, the inlier may comprise only the feature pair (a similarity inlier) which fulfils a match criteria with respect to similarity, or it may comprise only the matching location (geometrical inlier), or both (overall inlier).

Although hamming distance histograms are described in detail in the above for determining relative humidity levels, other types of histograms may equally well be used. The histogram may be formed based on a number of similarity measure adapted for comparing binary or non-binary fingerprint features. For example, so called Jacard, Dice, or Czekanowski measure known as such in the art may be employed.

Figure 5:
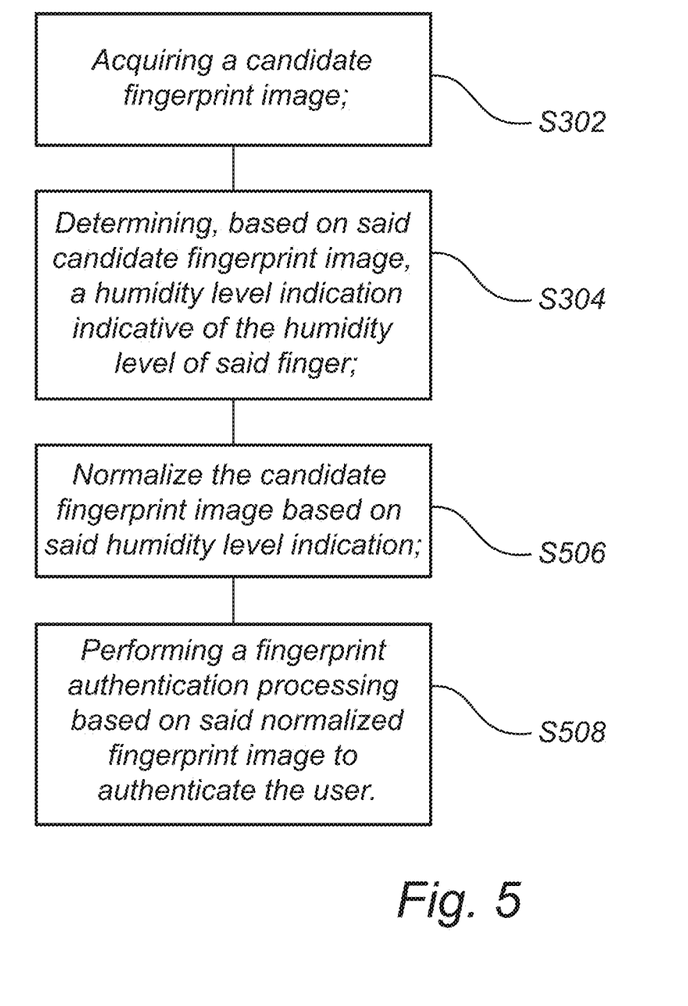
FIG. 5 is a flow-chart of method steps according to an embodiment of the invention.

As discussed above, several options for pre-processes are within the scope of the invention. One type of pre-process comprises to normalize the candidate fingerprint image based on the humidity level indication. In this case, the method according to this embodiment is outlined in the flow-chart of FIG. 5. Similar to the method steps described with reference to FIG. 3, a candidate fingerprint image is acquired S302 and a humidity level indication is determined S304 based on the candidate fingerprint image. In the embodiment in FIG. 5, the next step S506 is to normalize the candidate fingerprint image based on the humidity level indication. Subsequently S508, the fingerprint authentication is performed on the normalized fingerprint image. The normalization may be performed in various ways, but always with the intention of normalizing the impact of the humidity on the fingerprint image. Thus, the amount of normalization depends on the determined humidity level indication. Normalization will next be discussed with reference to FIGS. 6a-c.

Figure 6A:
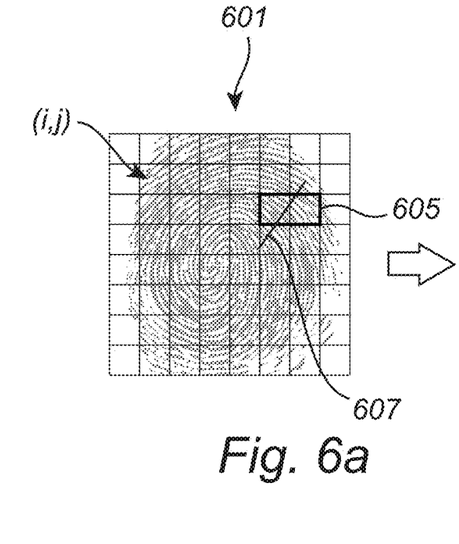
FIG. 6a-c conceptually illustrates a normalization procedure.
Figure 6B:
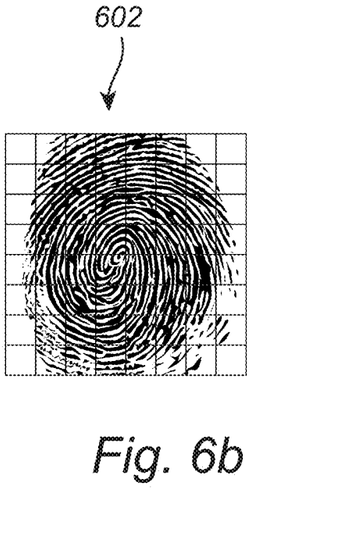
Figure 6C:
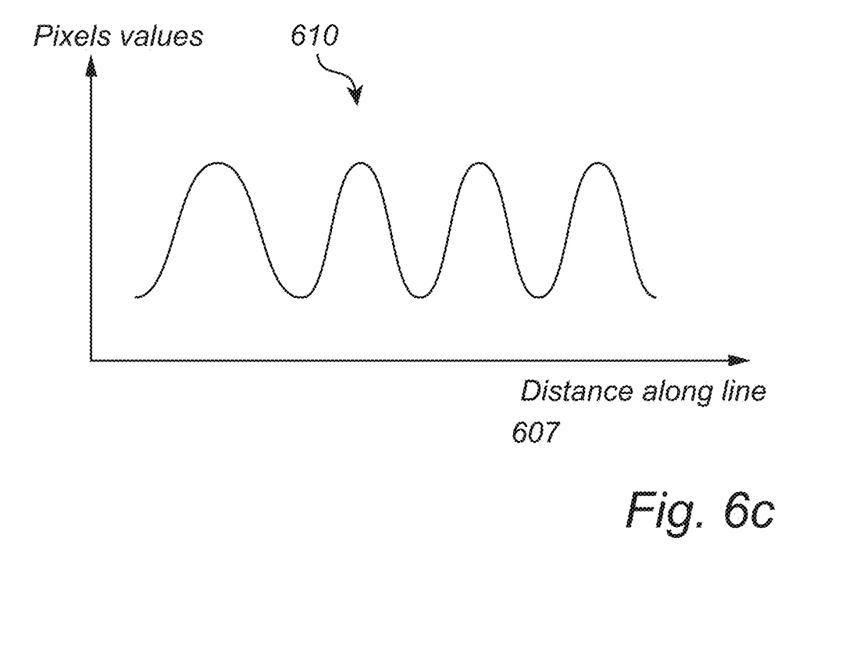

FIG. 6a-b illustrates example fingerprint images. FIG. 6a is the raw input image 601 obtained with a fingerprint sensor and FIG. 6b is the normalized image 602. By a simple visual comparison it is possible to see that the normalized image more clearly reproduces the fingerprint pattern. The normalization is configured to normalize the gray level value of each pixel value in the image in order to reduce the impact of the humidity of the finger when the image was captured. Example normalization may be given by:

$$G(i,j) = \begin{cases} M_0 + \sqrt{\dfrac{VAR_0(I(i,j)-M)^2}{VAR}}, & \text{if } I(i,j) > M \\ M_0 - \sqrt{\dfrac{VAR_0(I(i,j)-M)^2}{VAR}}, & \text{otherwise,} \end{cases}$$

where $I(i,j)$ is the gray level at pixel $(i,j)$, M denotes the mean of I, VAR denotes the variance of I, $G(i,j)$ is the normalized gray level at pixel $(i,j)$, and $M_0$ and $VAR_0$ are the desired mean and variance of the pixel gray levels. Note that this is only one type of possible normalization and that other types of normalization are equally well applicable and within the scope of the invention.

Another type of normalization is based on applying filters to the pixel values. For example, the cross-sectional shape of ridges and valleys appear in an oscillation type shape 610 (FIG. 6c) in a local region 605 of constant or near constant orientation of the ridges and valleys. Such an oscillation may for example be similar to a sinusoidal oscillation having an oscillation frequency. An exemplary local region 605 with at least near constant orientation of ridges and valley is indicated in FIG. 6a. Normalization may be performed by applying a filter, e.g. a bandpass filter to the image. Considering that the image in the local region 605 may be at least partly described by the oscillation 610 describing the oscillation type shape of the ridges and valleys, noise from the image may be removed by an appropriately selected bandpass filter such that the shape of ridge and valley may be preserved. One type of bandpass filter which may be applied is a Gabor filter, known as such to the skilled person.

When normalizing using a Gabor filter, a set of Gabor filters with varying filter parameters, e.g. different orientation and frequency for each Gabor filter may be used. During normalization, each pixel value may for example be replaced with the highest filter output value for that pixel. The highest filter output being the highest output value among the output values from the Gabor filter set for that specific pixel. The orientation of the filter is determined by the local ridge orientation and the frequency of the filter is determined by the frequency of the local ridge appearance in the local region 605, as indicated by the oscillatory function 610 of ridge and valleys in FIG. 6c.

Figure 7:
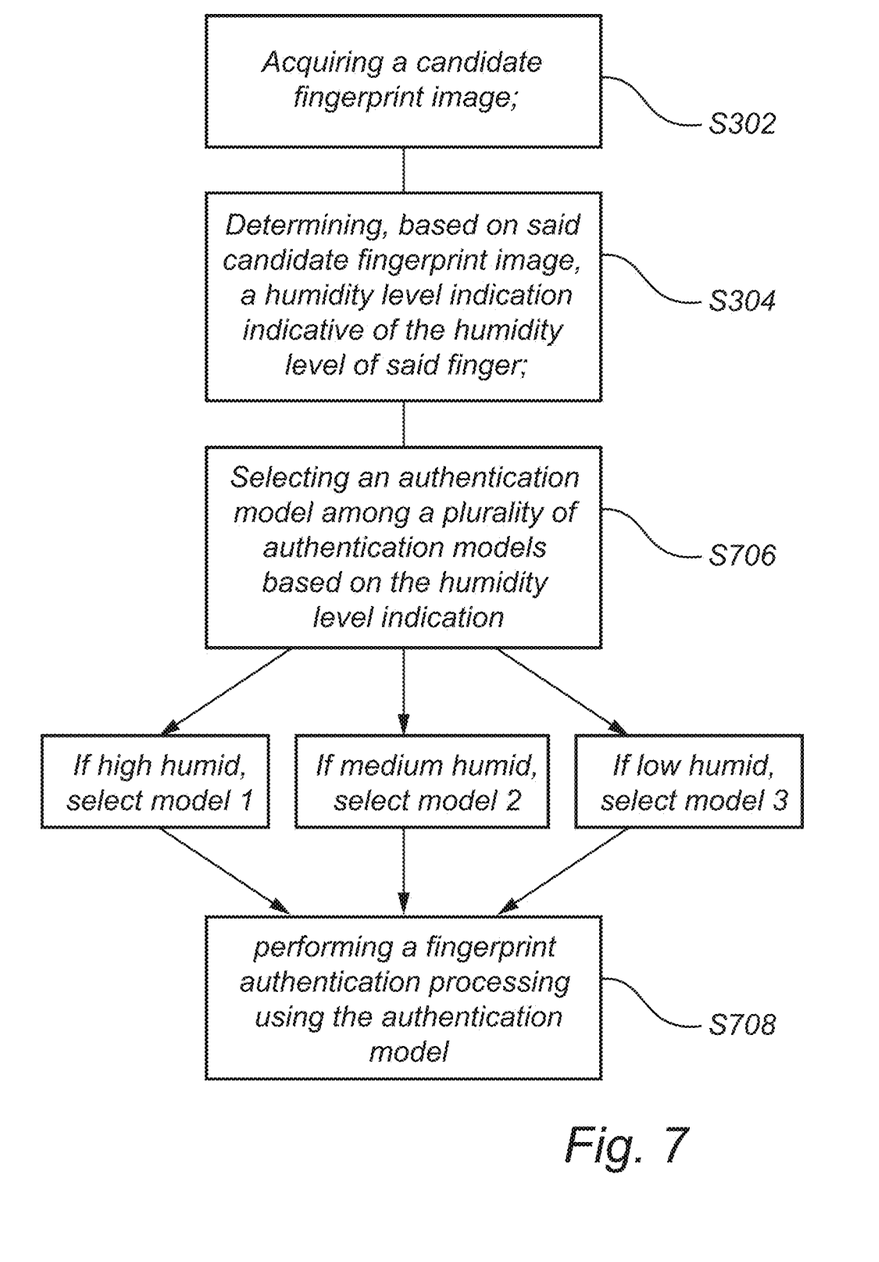
FIG. 7 is a flow-chart of method steps according to an embodiment of the invention.

Another type of pre-process comprises selecting an authentication model. In this case, the method according to this embodiment is outlined in the flow-chart of FIG. 7. Similar to the method steps described with reference to FIG. 3 and FIG. 6, a candidate fingerprint image is acquired S302 and a humidity level indication is determined S304 based on the candidate fingerprint image. In the embodiment of FIG. 7, the next step S706 is to select an authentication model among a plurality of authentication models based on the humidity level indication. As is conceptually shown, if the humidity falls in a category representative of a "high" humidity, a first model may be selected, if the humidity falls in a category representative of a "medium" humidity, a second model may be selected, and if the humidity falls in a category representative of a "low" humidity, a third model may be selected. Of course, more than three models may be included, but only three is shown here for clarity. Fingerprint authentication is subsequently performed S708 using the selected authentication model.

The models described with reference to the flow-chart in FIG. 7 is based on training a machine learning algorithm with data annotated with known humidity level indications. For example, a machine learning network comprising a support vector machine may be fed with data including parameter feature values such as sum of hamming distances, sum of inliers hamming distances, count of inliers, mean hamming distance, standard deviation of hamming distances, mean inlier hamming distance, mean inlier status (ratio of inliers), standard deviation of the inlier status, and a hamming histogram as described with reference to FIG. 4, etc. The data is annotated with a humidity level indication such that the machine-learning framework can learn to recognize different humidity levels depending on the input data determined from a fingerprint image. This type of machine-learning is commonly denoted supervised learning, and preferably a support vector machine or a neural network is used.

From the machine learning network, a plurality of models 801, 803, 805 are generated. As conceptually shown in FIG. 8, each model 801, 803, 805 comprises a set of parameter feature values 802, 804, 806 for a set of parameters. The set of parameter feature values for each model 801, 803, 805 is together characteristic of a humidity level as determined by a machine learning algorithm. For example, model 801 may be indicative of "high humidity", model 803 may be indicative of "medium humidity", and model 805 may be indicative of "low humidity".

Figure 8:
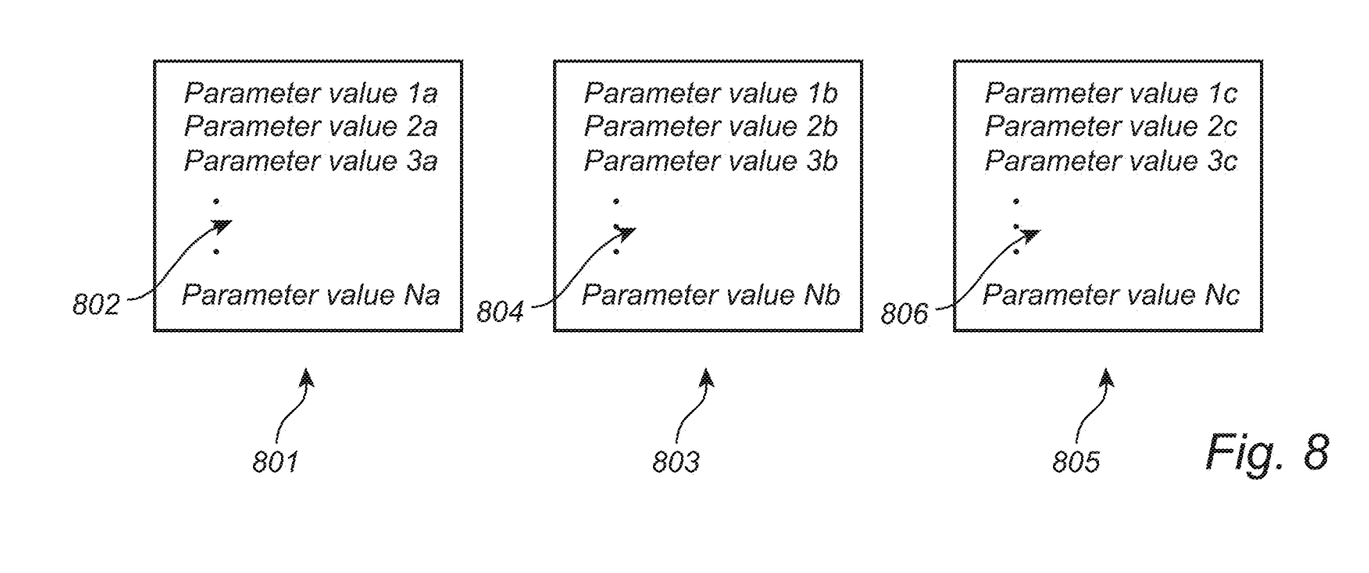
FIG. 8 conceptually illustrates authentication models.

For an authentication process, a plurality of feature values are extracted from a fingerprint image and compared to a plurality of predetermined parameter feature values. These predetermined parameters feature values may serve as threshold values for the extracted feature values mentioned above. Thus, the sets of parameter feature values 802, 804, 806 may serve as threshold values providing conditions which the extracted feature values have to fulfill for a successful authentication. From the training of the support vector machine, it is known which model is suitable for a determined humidity level, accordingly, based on the determined humidity, a predetermined model 801, 803, 805 is chosen in the authentication pre-process for the subsequent authentication process.

As may be understood, the detection of the humidity level may be performed as part of an authentication process. In more detail and as an example, if a first authentication fails with a first model (e.g. one of models 801, 803, 805), a second model is selected based on a humidity level indication determined from the output of the first authentication, for example as described with reference to FIG. 4, and then perform a second authentication process based on the second model.

Figure 9:
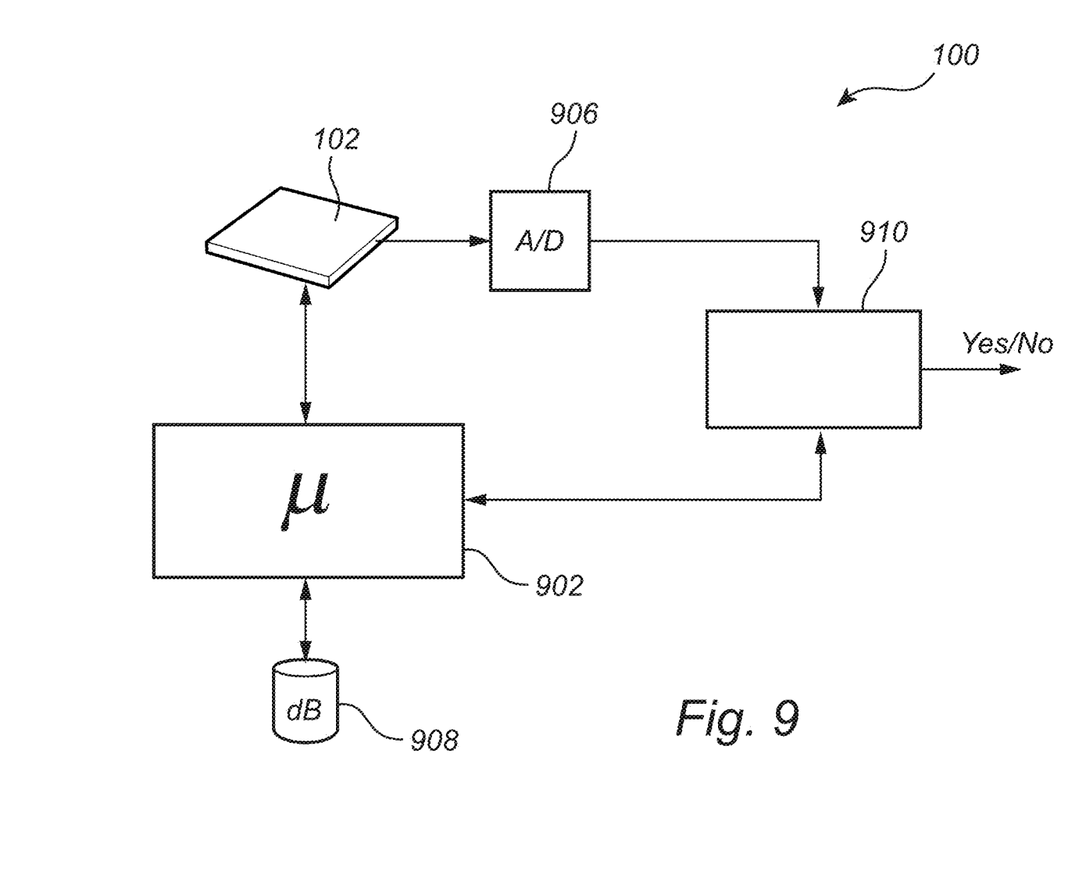
FIG. 9 conceptually illustrates an electronic device according to an embodiment of the invention.

Turning now instead to FIG. 9 conceptually illustrating an electronic device 100 comprising the fingerprint sensor 102 and a processing circuitry, such as a control unit 902 for controlling the fingerprint sensor 102. The electronic device 100 further comprises an A/D conversion module 906 and a memory, such as a database 908. The A/D conversion module 906 and the database 908 are all communicatively connected with the control unit 902. In addition, the electronic device 900 comprises a comparison and verification module 910, adapted for authenticating a candidate fingerprint against an enrolled fingerprint according to an authentication model. The comparison and verification module 910 may be incorporated in the control unit 902.

The control unit 902 is configured to control the fingerprint sensor 102 to acquire a candidate fingerprint image, and based on the image determine a humidity level indication. The humidity level indication may be determined based on comparing the image with an enrolment fingerprint image which may provide a relative humidity level indication. The humidity level indication may also be determined as an absolute humidity level. The control unit 902 may comprise a machine learning frame-work running a machine learning algorithm for determining humidity levels from the acquired candidate fingerprint image. Further, determining the humidity level indication may be based on gain or shift settings in the A/D converter 906, and/or based on a pixel gain setting of the fingerprint sensor 102. The settings may be read off by the control unit 902. The comparison and verification module 910, or the control unit performs an authentication pre-process based on the humidity level indication as described above, e.g. performs a normalization or model selection, or provides instructions to the user. Based on the authentication pre-process, the control unit 902 or the comparison and verification module 910 performs a fingerprint authentication process to authenticate the user.

The control unit includes a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device. It should be understood that all or some parts of the functionality provided by means of the control unit (or generally discussed as "processing circuitry") may be at least partly integrated with the fingerprint sensor.

The control functionality of the present disclosure may be implemented using existing computer processors, or by a special purpose computer processor for an appropriate system, incorporated for this or another purpose, or by a hardwire system. Embodiments within the scope of the present disclosure include program products comprising non-transitory machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. Additionally, even though the invention has been described with reference to specific exemplifying embodiments thereof, many different alterations, modifications and the like will become apparent for those skilled in the art.

In addition, variations to the disclosed embodiments can be understood and effected by the skilled addressee in practicing the claimed invention, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A method for authenticating a finger of a user of an electronic device comprising a fingerprint sensor for sensing a fingerprint pattern, said method comprising the steps of:
    acquiring a candidate fingerprint image;
    forming a verification representation based on the candidate fingerprint image;
    retrieving an enrollment representation formed from an enrolment fingerprint image;
    determining a humidity level indication indicative of the humidity level of said finger based on a comparison between the enrollment representation and the verification representation, wherein said humidity level indication is determined based on a histogram based on the comparison between the enrollment representation and the verification representation;
    performing an authentication pre-process based on said humidity level indication;
    performing a fingerprint authentication process based on said authentication pre-process to authenticate the user.

2. The method according to claim 1, wherein determining the humidity level indication is further based on an imaging acquisition setting for said fingerprint sensor.

3. The method according to claim 1, wherein the histogram is a hamming distance histogram.

4. The method according to claim 1, wherein the authentication pre-process comprises:
    selecting an authentication model among a plurality of authentication models based on the humidity level indication, whereby said fingerprint authentication process is performed using said selected authentication model.

5. The method according to claim 4, further comprising:
    performing a first fingerprint authentication process based on the candidate fingerprint image and a first authentication model,
    when the fingerprint authentication process results in a decision that authentication is not granted, determine, based on said candidate fingerprint image, said humidity level indication indicative of the humidity level of said finger;
    selecting said authentication model based on said humidity level indication.

6. The method according to claim 1, wherein the authentication pre-process comprises:
    forming a normalized candidate fingerprint image from said candidate fingerprint image based on said humidity level indication, wherein said fingerprint authentication process is performed on said normalized candidate fingerprint image.

7. A method for authenticating a finger of a user of an electronic device comprising a fingerprint sensor for sensing a fingerprint pattern, said method comprising:
    acquiring a candidate fingerprint image;
        determining, based on said candidate fingerprint image, a humidity level indication indicative of the humidity level of said finger;
    performing an authentication pre-process based on said humidity level indication, the authentication pre-process comprising providing instructions to said user based on said humidity level indication;
    acquiring a second candidate fingerprint image;
        determining, based on said second candidate fingerprint image, a second humidity level indication indicative of the humidity level of said finger;
    performing a second authentication pre-process based on said second humidity level indication; and
        performing a fingerprint authentication process based on said second authentication pre-process and said second candidate fingerprint image to authenticate the user.

8. A fingerprint sensing system comprising:
    a fingerprint sensor being configured to obtain a fingerprint image of at least a portion of a user's finger; and
    a control unit connected to said fingerprint sensor configured to:
        control the fingerprint sensor to acquire a candidate fingerprint image;
        form a verification representation based on the candidate fingerprint image;
        retrieve an enrollment representation formed from an enrolment fingerprint image;
        determine a humidity level indication indicative of the humidity level of said finger based on a comparison between the enrollment representation and the verification representation, wherein said humidity level indication is determined based on a histogram based on the comparison between the enrollment representation and the verification representation;
        perform an authentication pre-process based on said humidity level indication; and
        perform a fingerprint authentication process based on said pre-process to authenticate the user.

9. An electronic device, comprising:
    a fingerprint sensing system according to claim 8, and a device controller for:
        providing an authentication request for said finger to the fingerprint sensing system;
        receiving said authentication signal from the fingerprint sensing system; and
        performing at least one action if said authentication signal indicates authentication success.

10. The electronic device according to claim 9, wherein the electronic device is a mobile phone.

11. The fingerprint sensing system according to claim 8, wherein to determine the humidity level indication is further based on an imaging acquisition setting for said fingerprint sensor.

12. The fingerprint sensing system according to claim 8, wherein the control unit is configured to, for the authentication pre-process:
    select an authentication model among a plurality of authentication models based on the humidity level indication, whereby said fingerprint authentication process is performed using said selected authentication model.

13. The fingerprint sensing system according to claim 8, wherein the control unit is configured to:
form a normalized candidate fingerprint image from said candidate fingerprint image based on said humidity level indication, wherein said fingerprint authentication process is performed on said normalized candidate fingerprint image.

14. The fingerprint sensing system according to claim 8, wherein the histogram is a hamming distance histogram.

15. The fingerprint sensing system according to claim 8, wherein said fingerprint sensor is a capacitive fingerprint sensor comprising a two-dimensional array of sensing elements configured to obtain a measure of the capacitive coupling between the finger and each sensing element.

16. A fingerprint sensing system, comprising:
a fingerprint sensor being configured to obtain a fingerprint image of at least a portion of a user's finger; and
a control unit connected to said fingerprint sensor configured to:
control the fingerprint sensor to acquire a candidate fingerprint image;
determine, based on said candidate fingerprint image, a humidity level indication indicative of the humidity level of said finger, wherein said control unit is configured to operate a support vector machine or a neural network for determining said humidity level indication;
perform an authentication pre-process based on said humidity level indication; and
perform a fingerprint authentication process based on said pre-process to authenticate the user.

17. An electronic device, comprising:
a fingerprint sensing system according to claim 9, and a device controller for:
providing an authentication request for said finger to the fingerprint sensing system;
receiving said authentication signal from the fingerprint sensing system; and
performing at least one action if said authentication signal indicates authentication success.

18. Computer program product comprising a non-transitory computer readable medium having stored thereon computer program means for controlling an electronic device, the electronic device comprising a control unit, and a fingerprint sensor, wherein the computer program product comprises:
code for controlling the fingerprint sensor to acquire a candidate fingerprint image;
code for forming a verification representation based on the candidate fingerprint image;
code for retrieving an enrollment representation formed from an enrolment fingerprint image;
code for determining a humidity level indication indicative of the humidity level of said finger based on a comparison between the enrollment representation and the verification representation, wherein said humidity level indication is determined based on a histogram based on the comparison between the enrollment representation and the verification representation;
code for performing an authentication pre-process based on said humidity level indication; and
code for performing a fingerprint authentication process based on said authentication pre-process to authenticate the user.

19. A fingerprint sensing system comprising:
a fingerprint sensor being configured to obtain a fingerprint image of at least a portion of a user's finger; and
a control unit connected to said fingerprint sensor configured to:
control the fingerprint sensor to acquire a candidate fingerprint image;
determine, based on said candidate fingerprint image, a humidity level indication indicative of the humidity level of said finger;
perform an authentication pre-process based on said humidity level indication, the authentication pre-process comprises providing instructions to said user based on said humidity level indication,
acquire a second candidate fingerprint image;
determine, based on said second candidate fingerprint image, a second humidity level indication indicative of the humidity level of said finger;
perform a second authentication pre-process based on said second humidity level indication,
perform a fingerprint authentication process based on said second authentication pre-process and said second candidate fingerprint image to authenticate the user.

20. An electronic device, comprising:
a fingerprint sensing system according to claim 19, and a device controller for:
providing an authentication request for said finger to the fingerprint sensing system;
receiving said authentication signal from the fingerprint sensing system; and
performing at least one action if said authentication signal indicates authentication success.

21. Computer program product comprising a non-transitory computer readable medium having stored thereon computer program means for controlling an electronic device, the electronic device comprising a control unit, and a fingerprint sensor, wherein the computer program product comprises:
code for controlling the fingerprint sensor to acquire a candidate fingerprint image;
code for determining, based on said candidate fingerprint image, a humidity level indication indicative of the humidity level of said finger;
code for performing an authentication pre-process based on said humidity level indication, the authentication pre-process comprises providing instructions to said user based on said humidity level indication;
code for controlling the fingerprint sensor to acquire a second candidate fingerprint image;
code for determining, based on said second candidate fingerprint image, a second humidity level indication indicative of the humidity level of said finger;
code for performing a second authentication pre-process based on said second humidity level indication; and
code for performing a fingerprint authentication process based on said second authentication pre-process and said second candidate fingerprint image to authenticate the user.

22. Computer program product comprising a non-transitory computer readable medium having stored thereon computer program means for controlling an electronic device, the electronic device comprising a control unit, and a fingerprint sensor, wherein the computer program product comprises:
code for controlling the fingerprint sensor to acquire a candidate fingerprint image;
code for determining, based on said candidate fingerprint image, a humidity level indication indicative of the humidity level of said finger, and to operate a support vector machine or a neural network for determining said humidity level indication;
code for performing an authentication pre-process based on said humidity level indication; and
code for performing a fingerprint authentication process based on said authentication pre-process to authenticate the user.

* * * * *